(12) United States Patent
Mauldin et al.

(10) Patent No.: US 7,771,700 B2
(45) Date of Patent: Aug. 10, 2010

(54) SORBENTS FOR REMOVAL OF MERCURY FROM FLUE GAS CROSS REFERENCE TO RELATED APPLICATIONS

(75) Inventors: Lloyd Ballard Mauldin, Cartersville, GA (US); Jerry Allen Cook, Cartersville, GA (US)

(73) Assignee: Chemical Products Corp., Cartersville, GA (US)

( * ) Notice: Subject to any disclaimer, the term of this patent is extended or adjusted under 35 U.S.C. 154(b) by 91 days.

(21) Appl. No.: 11/990,092

(22) PCT Filed: Nov. 28, 2005

(86) PCT No.: PCT/US2005/042988

§ 371 (c)(1),
(2), (4) Date: Feb. 5, 2008

(87) PCT Pub. No.: WO2007/046822

PCT Pub. Date: Apr. 26, 2007

(65) Prior Publication Data

US 2009/0145343 A1    Jun. 11, 2009

(51) Int. Cl.
*C01B 17/42* (2006.01)
*C01B 17/44* (2006.01)
*B01D 53/64* (2006.01)
*C01F 11/46* (2006.01)
*C01F 11/48* (2006.01)
*C01F 5/40* (2006.01)
*C01F 5/42* (2006.01)

(52) U.S. Cl. ............ 423/566.3; 423/178; 423/210; 423/519.2; 423/554; 423/555; 423/562; 588/412

(58) Field of Classification Search ............ 423/210, 423/178, 519.2, 554, 555, 562, 566.3; 588/412
See application file for complete search history.

(56) References Cited

U.S. PATENT DOCUMENTS

| | | | | | |
|---|---|---|---|---|---|
| 3,790,535 | A | * | 2/1974 | Motani et al. | 528/487 |
| 4,474,896 | A | * | 10/1984 | Chao | 502/216 |
| 4,681,777 | A | * | 7/1987 | Engelken et al. | 438/572 |
| 5,618,508 | A | * | 4/1997 | Suchenwirth et al. | 423/245.1 |
| 6,663,690 | B2 | * | 12/2003 | Katz | 95/57 |
| 7,288,499 | B1 | * | 10/2007 | Lovell et al. | 502/80 |

OTHER PUBLICATIONS

"Calcium sulfide," Sigma-Aldrich online catalog, viewed Dec. 31, 2009 at http://www.sigmaaldrich.com/catalog/ProductDetail.do?lang=en&N4=409553|ALDRICH &N5=SEARCH_CONCAT_PNO|BRAND_KEY&F=SPEC.*

* cited by examiner

*Primary Examiner*—Timothy C Vanoy
*Assistant Examiner*—Daniel Berns

(57) ABSTRACT

Systems are disclosed for making and using micro-porous particulates at least partially composed of metal sulfides, particularly alkaline earth metal and transition metal sulfides, as sorbents for removal of mercury from flue gas. Calcium sulfide micro-porous powders derived from the high temperature reduction of calcium sulfate and calcium sulfite are disclosed to be reactive substrates for a group of sorbents for adsorption of mercury from coal combustion flue gases produced by the utilities industry, as well as from natural gas and gaseous and liquid hydrocarbons. The sorbents are useful for cost-effectively adsorbing elemental mercury and oxidized mercury species such as mercuric chloride from flue gases, including those containing acid gases (e.g., $SO_2$, NO and $NO_2$, and HCl), over a wide range of temperatures.

25 Claims, No Drawings

SORBENTS FOR REMOVAL OF MERCURY FROM FLUE GAS CROSS REFERENCE TO RELATED APPLICATIONS

CROSS REFERENCE TO RELATED APPLICATIONS

This application claims priority to and the benefit of U.S. application Ser. No. 11/163,366 filed Oct. 17, 2005 now abandoned.

BACKGROUND OF INVENTION

This invention relates to a composition for gas treatment to remove heavy metals, particularly mercury, from gas streams, particularly flue gas streams, and processes and systems for making and using the composition. In particular, the invention relates to a sorbent for removal of mercury from flue gas and processes and systems for making and using the sorbent.

In August 2000, the National Research Council completed a study that determined that the U.S. Environmental Protection Agency's (EPA) conservative exposure reference dose of 0.0001 mg mercury/kg body weight/day was scientifically justified to protect against harmful neurological effects during fetal development and early childhood. Subsequently, in December 2000, EPA announced its intention to regulate mercury and other air toxics emissions from coal- and oil-fired power plants. The pending regulation has created an impetus in the utility industry to find cost-effective solutions to meet the impending mercury emission standards.

Domestic coal-fired power plants emit a total of about fifty metric tons of mercury into the atmosphere annually—approximately one third of all anthropogenic mercury emissions in the U.S. A coal-fired utility boiler emits several mercury species, predominantly in the vapor-phase in boiler flue gas, including elemental mercury, and ionic mercury in mercuric chloride ($HgCl_2$) and mercuric oxide ($HgO$)—in different proportions, depending on the characteristics of the coal being burned and on the combustion conditions.

Today, municipal solid waste (MSW) incinerators and medical waste combustors predominantly utilize the best commercially available control technology for reduction of mercury emissions: adsorption of mercury species onto activated carbon. Although fairly effective for MSW incinerators, activated carbon is a less appealing solution for coal-fired flue gas streams because of the dramatic difference in mercury concentrations. Regulations for mercury control from municipal and medical waste incinerators specify outlet emission levels of no more than fifty micrograms per cubic meter. In coal-fired flue gas streams, typical uncontrolled mercury concentrations are on the order of ten micrograms per cubic meter. Thus, reduction of mercury emissions from coal combustion flue gases presents a unique challenge in that the mercury is present in low concentrations in very large volumes of flue gas.

Fixed beds of zeolites and carbons have been proposed for a variety of mercury-control applications, but none has been developed specifically for control of mercury in coal combustion flue gas. Products in this class include Lurgi GmbH's (Frankfurt, Germany) Medisorbon and Calgon Carbon Corporation's (Pittsburgh, Pa.) HGR.

Calcium carbonate (limestone), calcium oxide (lime), and calcium hydroxide (slaked lime) are employed in flue gas desulfurization (FGD). Sulfur dioxide in flue gas reacts with these materials to yield solid calcium sulfite. It is known that some of the mercury in the flue gas is removed in the flue gas desulfurization processes employed by electric utilities, however the proportion of mercury removed falls short of the goals set by EPA. Some installed FGD systems allow relatively pure calcium sulfite to be oxidized to calcium sulfate (FGD Gypsum) which may be sold for use in wallboard. Unlike FGD gypsum, which can be sold, most power plants have to pay to dispose of sulfite-rich scrubber material. Out of 18 million tons of sulfite-rich scrubber material produced by coal-burning power plants in 2000, 3 million tons were disposed of as wet by-product, 12 million tons were disposed of in landfills as dry by-product, and only 1 million tons were used for any meaningful purpose at coal-burning electric utility sites. This material presents environmental challenges due to concerns associated with long-term impacts of calcium-sulfite landfills. A beneficial use for FGD calcium sulfite-rich by-product, which is often admixed with varying amounts of unreacted calcium carbonate, oxide, or hydroxide, as well as coal combustion ash, is being sought by coal-burning electric utilities.

At present, the injection of activated carbon is generally considered to be the best available demonstrated control technology for reduction of mercury emissions from coal-fired power plants that do not have wet scrubbers (about seventy-five percent of all such plants in the U.S.). Tests of carbon injection, both activated and chemically impregnated, have been reported in the technical literature. In order to achieve EPA's goal of removing 90% of the low mercury concentrations found in coal combustion flue gases, projected injection rates for activated carbon are on the order of 10,000 to more than 20,000 pounds of activated carbon for each pound of mercury removed, depending on the physical characteristics of the activated carbon, and the concentration and speciation of mercury in the flue-gas. The cost to implement effective activated carbon mercury control systems has been estimated by the U.S. Department of Energy (DOE) to be on the order of US$60,000 per pound of mercury removed.

Activated carbon injection rates for effective mercury control at different facilities have been found to be widely variable and are explained by the dependence of the sorption process on flue gas temperature and composition, efficiency of dispersion of the activated carbon throughout the flue gas stream, mercury speciation and also on fly ash chemistry. When employed for mercury control, some of the carbon becomes part of the ash collected by particulate-control devices and would be expected to make the fly ash unsuitable for incorporation into concrete. This impact on the marketability of collected fly ash can substantially increase the effective cost of mercury control for a coal-fired power plant, and more of this major coal combustion by-product would become a waste to occupy landfill space.

In addition to the economic drawbacks presented by the use of activated carbon sorbent for mercury control, technical viability issues remain to be resolved. Coal-fired combustion flue gas streams include trace amounts of acid gases, including $SO_2$, $NO$ and $NO_2$, and $HCl$. This mix of acid gases has been shown to degrade the performance of some of the chemically treated activated carbons and other sorbents such as noble-metal-impregnated alumina.

Regenerable sorbents with an initial cost roughly equivalent to activated carbon have been developed with the aim of reducing the overall cost of mercury removal through recycle of the sorbent. These sorbents employ a phyllosilicate mineral substrate and precipitate a polyvalent sulfide from aqueous solution onto the mineral's surface in a multistep aqueous process (U.S. Pat. No. 6,719,828 to Lovell et al.). Collecting and processing such a sorbent to regenerate such a fine particulate material would be expected to present significant unresolved challenges for the typical coal-fired power plant.

While micro-porosity is a critical characteristic of an efficient sorbent for mercury from flue gases, mass transfer of gaseous mercury by diffusion from the bulk flue gas to the solid surface can limit capture of mercury; diffusion within a porous sorbent is not believed to be rate-limiting (Status review of mercury control options for coal-fired power plants; John H. Pavlish, et al.; Energy and Environmental Research Center; 2003). Reducing the size of the sorbent particles and increasing their dispersion in the gas stream enhances control, but large quantities of sorbent are required in all instances. Pavlish et al. found that to achieve 90% mercury removal in 2 seconds residence time by activated carbon injection required a minimum carbon-to-mercury mass ratio of about 3,000:1 for 4 micron particles and about 18,000:1 for 10 micron particles. Assuming constant density for the carbon particles and more spherical particles as the particle size decreases, the data of Pavlish et al. indicate that approximately the same number of 10 micron particles or 4 micron particles are required to achieve the 90% mercury removal. Chemical treatments to enhance the ability of activated carbon and micro-porous mineral substrates to adsorb and fix mercury increase the cost per pound of sorbent, thus substantially increasing the cost of overcoming this mass transfer limitation. An effective sorbent with a cost far below the cost for activated carbon is needed to allow the necessary large number of particulates to be dispersed within the flue gas stream to cost-effectively overcome this mass transfer by diffusion limitation.

Thus a pressing need exists for a mercury sorbent which is capable of being dispersed in a coal combustion flue gas stream as very small particulates, is capable of adsorbing both elemental and ionic mercury species, is substantially less expensive than activated carbon, and has characteristics which allow it to be incorporated into concrete along with coal combustion ash. A preferred embodiment of the present invention utilizes calcium sulfite-rich FGD by-product material for the production of an effective low-cost calcium sulfide-rich mercury sorbent.

U.S. Pat. No. 4,193,811 to Ferm teaches that alkaline earth metal polysulfides, particularly calcium polysulfide, are beneficial additives to concrete in that they act as strength enhancers.

U.S. Pat. No. 3,194,629 to Dreibelbis et al. discloses impregnation of activated carbon with elemental sulfur as a sorbent for removing mercury from gases.

U.S. Pat. No. 3,873,581 to Fitzpatrick et al. discloses a process for reducing the level of contaminating mercury in aqueous solutions. The process is applied to aqueous solutions and not to gases and it relies on treating an adsorbent with a mercury-reactive factor. Disclosed absorbents are titania, alumina, silica, ferric oxide, stannic oxide, magnesium oxide, kaolin, carbon, calcium sulfate, activated charcoal, activated carbon, activated alumina, activated clay or diatomaceous earth.

U.S. Pat. No. 4,069,140 to Wunderlich discloses a method for removing arsenic or selenium from a synthetic hydrocarbon fluid by use of a contaminant-removing material. The contaminant-removing material comprises a carrier material and an active material. Carrier materials are selected from the group consisting of silica, alumina, magnesia, zirconia, thoria, zinc oxide, chromium oxide, clay, kieselguhr, fuller's earth, pumice, bauxite and combinations thereof. The active material is selected from the group consisting of iron, cobalt, nickel, at least one oxide of these metals, at least one sulfide of these metals, and combinations thereof.

U.S. Pat. No. 4,094,777 to Sugier et al. discloses a process for removing mercury from a gas or liquid. It teaches impregnation of a support only with copper and silver, although other metals can be present, for example iron. The supports taught are limited to silica, alumina, silica-alumina, silicates, aluminates and silico-aluminates; and incorporation of both metal (s) and pore-forming materials during production of the supports is taught to be necessary. Only relatively large adsorption masses are envisioned, e.g., alumina balls. Only a fixed bed reactor is taught for contacting the gas with the absorption masses, as would be appropriate for natural gas or electrolytic hydrogen decontamination, which are the only disclosed uses of the compositions and process.

U.S. Pat. No. 4,101,631 to Ambrosini et al. discloses a process for selective adsorption of mercury from a gas stream. This invention involves loading a natural or synthetic zeolite molecular sieve with elemental sulfur before the zeolite molecular sieve is contacted with the gas stream. Metal sulfides are not present in the zeolite molecular sieve when it is contacted with the gas stream. The use of pellets in adsorption beds is disclosed.

U.S. Pat. No. 4,233,274 to Allgulin discloses a method for extracting and recovering mercury from a gas. The invention requires that the gas be contacted with a solution containing mercury (II) ions and ions with the ability to form soluble complexes with such ions.

U.S. Pat. No. 4,474,896 to Chao discloses adsorbent compositions for the adsorption of mercury from hydrocarbon gas streams. Disclosed support materials are limited to carbons, activated carbons, ion-exchange resins, diatomaceous earths, metal oxides, silicates, aluminas, and aluminosilicates, with the most preferred support materials being ion-exchange resins and crystalline aluminosilicate zeolites that undergo a high level of ion-exchange. The adsorbent compositions are required to contain polysulfide species, while sulfide species may optionally also be present. Metal cations appropriate for ion-exchange or impregnation into the support material are taught to be antimony, arsenic, bismuth, cadmium, cobalt, copper, gold, indium, iron, iridium, lead, manganese, molybdenum, mercury, nickel, platinum, silver, tin, tungsten, titanium, vanadium, zinc, zirconium and mixtures thereof derived from carboxylic acids, nitrates and sulfates. The only forms of adsorbent compositions disclosed are $\frac{1}{16}$-inch pellets.

U.S. Pat. No. 4,721,582 to Nelson discloses a composition comprising water-laden, exfoliated vermiculite that is coated with magnesium oxide for use as a toxic gas adsorbent and processes for making the same.

U.S. Pat. No. 4,814,152 to Yan discloses a composition and process for removing mercury vapor. The composition comprises a solid support that is limited to a carbonaceous support such as activated carbon and activated coke, and refractory oxides such as silicas, aluminas, aluminosilicates, e.g., zeolites. The solid support is impregnated with elemental sulfur.

U.S. Pat. No. 4,834,953 to Audeh discloses a process for removing residual mercury from treated natural gas. The process is limited to contacting the gas first with an aqueous polysulfide solution and then with a soluble cobalt salt on a non-reactive carrier material such as alumina, calcium sulfate, or silica.

U.S. Pat. No. 4,843,102 to Horton discloses a process for removal of mercury from gases with an anion exchange resin. The invention is limited in that the anion exchange resin is saturated with a polysulfide solution.

U.S. Pat. No. 4,877,515 to Audeh discloses the use of molecular sieves (zeolites) pretreated with an alkali polysulfide to remove mercury from liquefied hydrocarbons. U.S. Pat. No. 4,902,662 to Toulhoat et al. discloses processes for preparing and regenerating a copper-containing, mercury-collecting mass. The mass is made by combining a solid inorganic carrier, a polysulfide and a copper compound. Appropriate solid inorganic carriers are limited to coal, active carbon, coke, silica, silica carbide, silica gel, natural or synthetic silicates, clays, diatomaceous earths, fullers earth, kaolin, bauxite, a refractory inorganic oxide such as alumina, titanium oxide, zirconia, magnesia, silicoaluminas, silicomagnesias and silicozirconias, alumina-boron oxide mixtures, aluminates, silicoaluminates, aluminosilicate crystalline zeolites, mazzites, and cements. U.S. Pat. No. 4,911,825 to Roussel et al. discloses a process for elimination of mercury and possibly arsenic in hydrocarbons. The invention requires that a mixture of the hydrocarbon and hydrogen be contacted with a catalyst, preferably deposited on a support chosen from alumina, silicoaluminas, silica, zeolites, active carbon, clays and alumina cements, and containing at least one metal from the group consisting of iron, cobalt, nickel and palladium. Contact with the catalyst is followed by contact with a capture mass including sulfur or a metal sulfide.

U.S. Pat. No. 4,962,276 to Yan discloses a process for removing mercury from water or hydrocarbon condensate using a stripping gas. The invention is limited to the use of a polysulfide scrubbing solution for removing the mercury from the stripping gas.

U.S. Pat. No. 4,985,389 to Audeh discloses polysulfide-treated molecular sieves and the use thereof to remove mercury from liquefied hydrocarbons. The molecular sieves are limited to calcined zeolites.

U.S. Pat. No. 5,120,515 to Audeh et al. discloses a method for dehydration and removal of residual impurities from gaseous hydrocarbons. The method is limited to replacing an inert protective layer on a pellet with an active compound comprising at least one of copper hydroxide, copper oxide and copper sulfide. Materials for the pellet are limited to alumina, silicoaluminas, molecular sieves, silica gels and combinations thereof.

U.S. Pat. No. 5,245,106 to Cameron et al. discloses a method for eliminating mercury or arsenic from a fluid. The process is limited to the incorporation of a copper compound into a solid mineral support, possible calcination of the impregnated support, contact of the impregnated support with elemental sulfur and heat treatment. The solid mineral supports are limited to the group formed by carbon, activated carbon, coke, silica, silicon carbide, silica gel, synthetic or natural silicates, clays, diatomaceous earths, fullers earths, kaolin, bauxite, inorganic refractory oxides such as for example alumina, titanium oxide, zirconium, magnesium, aliminosilicates, silicomagnesia and silicozirconia, mixtures of alumina and boron oxide, the aluminates, silicoaluminates, the crystalline, synthetic or natural zeolitic aluminosilicates, mazzites and cements.

U.S. Pat. No. 5,248,488 to Yan discloses a method for removing mercury from natural gas. The method is limited to contacting the natural gas with a sorbent material such as silica, alumina, silicoalumina or activated carbon having deposited on the surfaces thereof an active form of elemental sulfur or sulfur-containing material.

U.S. Pat. No. 5,695,726 to Lerner discloses a process for removal of mercury and cadmium and their compounds from incinerator flue gas. The invention is limited to contacting a gas containing HCl with a dry alkaline material and a sorbent followed by solids separation. Activated carbon, fuller's earth, bentonite and montmorillonite clays are disclosed as sorbents having an affinity for mercuric chloride.

U.S. Pat. No. 5,846,434 to Seaman et al. discloses an in-situ groundwater remediation process. The process is limited to mobilizing metal oxide colloids with a surfactant and capturing the colloids on a phyllosilicate clay.

U.S. Pat. No. 6,719,828 to Lovell et al. teaches preparation of mercury sorbents composed of polyvalent metal sulfides precipitated from aqueous solution onto a finely divided phyllosilicate substrate in a multi-step process. The estimated manufactured cost for these sorbents is stated to be about $0.50 per pound of sorbent, compared to $0.55 per pound for activated carbon, but the sorbents are taught to be recyclable.

U.S. Pat. No. 5,653,955 to Wheelock teaches regeneration of calcium oxide used to remove hydrogen sulfide from the gases resulting from coal gasification processes. Cyclic oxidation and reduction are taught to overcome the formation of an impermeable layer of calcium sulfate on the surface of calcium sulfide particles formed by reaction of hydrogen sulfide gas with calcium oxide particles. Calcium oxide and sulfur dioxide are the products of the process taught.

No individual background art reference or combination of references teach or anticipate the compositions, processes and systems disclosed herein.

SUMMARY OF INVENTION

The purpose of this invention is to provide compositions, processes and systems for removal of heavy metals, particularly mercury, from gas streams. This invention is particularly directed to removal of mercury from flue gases resulting from the combustion of coal.

Unique micro-porous particulates composed at least partially of metal sulfides result from the chemical reduction of materials composed at least partially of the corresponding metal sulfates or metal sulfites at elevated temperatures in the range from about 900 degrees C. to about 1100 degrees C. These metal sulfide containing particulates have been found to exhibit unique and highly desirable physical characteristics to enable their use as sorbents and substrates for other sorbents to remove heavy metals, particularly mercury, from coal combustion flue gases.

Metal sulfides, particularly polyvalent metal sulfides, have heretofore been available as sorbents for mercury only in the form of monomolecular layers applied with difficulty to various micro-porous substrates such as activated carbon, or phyllosilicates such as vermiculite, because said metal sulfides have heretofore been available only in the form of dense, non-porous particulates unsuitable for use as sorbents. The process of the present invention yields metal sulfides, particularly polyvalent metal sulfides, more particularly transition metal and alkaline earth metal sulfides, and most particularly alkaline earth metal sulfides, having a physical form suitable for use directly as sorbents for heavy metals, particularly mercury, from gas streams.

A novel method of preparing a micro-porous polyvalent metal sulfide for use as a mercury sorbent is taught herein. The micro-porous metal sulfide containing particulates disclosed herein can be readily admixed with liquid or gaseous sulfur, metal polysulfides, and other metal salts, particularly transition metal halide salts, to produce efficient heavy metal sorbents, particularly mercury sorbents, tailored for use in coal combustion flue gases at different temperatures and containing differing levels and compositions of acid gases, and differing mercury speciation.

DETAILED DESCRIPTION

It has been discovered that novel micro-porous sorbent particulates composed at least partially of one or more metal sulfides are produced by the chemical reduction of one or more metal sulfates or one or more metal sulfites to the corresponding metal sulfides by employing a gaseous reductant at temperatures above about 900 degrees C., but below the melting temperatures of said metal sulfates, metal sulfites, and metal sulfides. These particulates act as sorbents for heavy metals, particularly mercury, when these micro-porous particulates are contacted with mercury-containing gases, particularly coal combustion flue gases. The unique micro-porous sorbent particulate morphology of the product of the present invention results from the high temperature reduction process integral to the process of the present invention. While not wishing to be limited by theory, it is believed that, in the process of the present invention, chemical reduction is accomplished by the diffusion of a reducing gas into solid particulates and the outward diffusion of a resulting oxidized gas species. The kinetics of this chemical reduction can be characterized by what is referred to as the "shrinking core reaction model". Reduction of metal sulfates, metal sulfites, or a combination thereof, to metal sulfides is most preferably carried out by employing carbon as the source of carbon monoxide gaseous reductant. Reduction occurs when carbon monoxide gas diffuses into solid particulates initially composed predominantly of metal sulfate or metal sulfite. Carbon monoxide is oxidized to carbon dioxide within the particulates containing metal sulfate or metal sulfite as the metal sulfate or metal sulfite is reduced to the corresponding metal sulfide. As the reaction proceeds carbon dioxide diffuses out of these solid particulates while carbon monoxide continues to diffuse into these same particulates which are developing substantial micro-porosity as large sulfate or sulfite ions in particulates' crystalline lattice are replaced by smaller sulfide ions, thus a micro-porous particulate structure results. Formation of the unique micro-porous sorbent particulate structure disclosed herein allows metal sulfides formed by the high temperature reduction of metal sulfates, metal sulfites, or a combination thereof, to be employed directly as sorbents and sorbent substrates for the removal of mercury from gas streams.

The micro-porous particulates of the present invention are preferably particulates containing calcium sulfide produced by the thermal reduction of calcium sulfite or calcium sulfate flue gas desulfurization by-products. Thus, a by-product existing at coal burning utilities can be employed as the raw material for a process to produce a much-needed economical sorbent for mercury removal from coal combustion flue gas. The coal combustion fly ash usually present as a component of flue gas desulfurization by-products does not have a detrimental effect on the use of sulfate-rich or sulfite-rich flue gas desulfurization by-products in the process of the present invention.

The metal sulfides of the invention disclosed herein act as effective substrates, as well as efficient sorbents, because of the unique micro-porosity in the metal sulfide particulates resulting from the reduction process employed to produce them. Polyvalent metal salts, particularly nitrates and chlorides, and sulfur can be employed to coat and chemically modify the surfaces in the interstices of the particulates of the present invention. While not wishing to be limited by theory, applicants believe that this micro-porosity is the result of the voids created as large sulfate or sulfite ions are replaced by sulfide ions within a solid particulate structure by means of the high temperature reduction process inherent in the process of the present invention. Only metal sulfides having a melting temperature higher than the 900 degrees C. to 1100 degrees C. chemical reduction reaction temperature will retain the unique micro-porous structure inherent in the product of the present invention. Thus, strontium sulfide, an alkaline earth metal sulfide, with a melting point above 2000 degrees C. retains the desired micro-porous structure. Calcium sulfide, another alkaline earth metal sulfide, has also been found to retain the micro-porous structure integral to the product of the present invention. Iron (II) sulfide, with a melting point of about 1171 degrees C., will retain the micro-porous structure inherent in the products of the present invention unless impurities are present which act as "mineralizers", that is, which act to reduce the temperature at which a liquid phase appears. To facilitate the process of high temperature reduction, it is highly desirable that the metal sulfates and metal sulfites subjected to the process of the present invention also remain solids at the high temperatures required to reduce sulfate and sulfite ions to sulfide ions using the reducing agents taught herein. In general, sulfates, sulfites, and sulfides of most polyvalent metals have very high melting temperatures and are suitable for the process of the present invention.

Thermal reduction is preferably accomplished in a high temperature countercurrent rotary kiln utilizing, as the reductant, coal or coke having a high fixed carbon content, i.e. a low volatile carbon content. Other types of thermal reduction process equipment are known to those skilled in the art; these may employ gaseous reductants such as carbon monoxide, hydrogen, and natural gas in equipment such as fluidized bed reactors.

In a high temperature countercurrent rotary kiln employing carbon as the reductant at temperatures in excess of about 900 degrees C., carbon monoxide gas is believed to react with sulfate and sulfite ions on or within solid particulates to remove oxygen from these ions and form carbon dioxide. The carbon dioxide diffuses out of these solid particulates, encounters solid carbon particles, reacts with the elemental carbon present to regenerate carbon monoxide, and thus perpetuates the reaction to allow further reduction of sulfate and sulfite ions to sulfide ions. Carbon monoxide must rapidly diffuse into the interior of a particulate to react to form carbon dioxide which must rapidly diffuse out of that particulate, thus particulate porosity is a requirement for the chemical reaction producing metal sulfide to proceed. Barium and strontium sulfide particulate materials are commercially produced by the thermal reduction of naturally-occurring barium sulfate and strontium sulfate ores reduced in size to granules passing through a U.S. Standard 14 mesh sieve. Kirk-Othmer Encyclopedia of Chemical Technology, Fourth Edition, Volume 3, page 913 states that for reduction of barium sulfate to barium sulfide, reaction completion is approached in less than 10 minutes at 1100 degrees C.; only a granule exhibiting substantial porosity in the portion of the granule containing the barium sulfide reaction product could accommodate sufficient gaseous diffusion, both into and out of the granule, to effect reaction completion in this short time.

The micro-porous metal sulfide containing particulates of the present invention can be employed as an inexpensive substrate for polyvalent metal ions, chloride ions, polysulfides, and elemental sulfur. Thus, the sorbent of the present invention can be optimized for any of the myriad flue gases resulting from combustion of different grades of coal and coals containing different impurities. In addition to elemental sulfur, polysulfide ions, and chloride ions, the following polyvalent metal ions, alone or in combination, can be incorporated into the micro-porous product of the present invention to promote mercury removal from gas streams: antimony, arsenic, bismuth, cadmium, cobalt, copper, gold, indium, iron, lead, manganese, molybdenum, mercury, nickel, platinum, silver, tin, tungsten, titanium, vanadium, zinc, and zirconium.

Mineral species including, but not limited to, phyllosilicates, kaolin clays, sepiolite, bentonite, vermiculite, and pearlite can be present as impurities in, or intentionally added to, the metal sulfate or metal sulfite containing material subjected to high temperature reduction without departing from the spirit of this invention. Mineral species including, but not limited to, phyllosilicates, kaolin clays, sepiolite, bentonite, vermiculite, and pearlite can be intentionally added to the micro-porous particulate composed at least partially of metal sulfide disclosed herein without departing from the spirit of this invention.

One advantage of the present invention is that the compositions (sorbents) disclosed herein can be cost-effectively employed in sufficient quantity in a gas stream to overcome the capture limitation imposed by the rate of mass transfer of gaseous mercury by diffusion from the bulk flue gas to the solid surface. Another advantage is that the disclosed sorbents are only minimally affected by typical acidic flue gases due to the micro-porous structure of the metal sulfide containing particulates embodied in this invention. A further advantage is that costly sorbent chemical components can be deployed into flue gases as molecularly thin films by utilizing the micro-porous particulates of the present invention as an inexpensive support substrate. In addition to having sorption characteristics that are comparable to commercial activated carbons for both elemental and oxidized mercury, the sorbents disclosed herein are substantially less expensive than activated carbon and do not adversely impact the value of coal combustion by-product fly ash by limiting its use as a concrete additive. Preferred forms of the sorbents disclosed herein ensure that they are "drop-in" replacements for carbon technology and do not require any additional technologies for injection, or collection. The improved capacity and efficiency, and the lower costs for the herein disclosed technology, promise to substantially reduce the costs of implementing mercury emissions controls on coal-burning electric power plants, benefiting both the utility industry and the U.S. public.

In most flue gas treatment systems, the contact time of a mercury sorbent with a mercury-containing gas is of very brief duration, on the order of about 2 seconds. Therefore, small particle size to promote dispersion of the sorbent in the flue gas is as important as the porosity of the individual sorbent particles. Surfaces closest to the bulk flue gas will probably perform the majority of the sorption. The metal sulfide micro-porous particulates of the present invention provide a reactive metal sulfide either as the primary reactive component or as a substrate for other reactive components, which are not required to be present as a continuous surface layer on the underlying metal sulfide.

Specific polyvalent metal sulfide reactants may be desired to enhance the performance of the product of the present invention in particular flue gas steams. Polyvalent metal ions can be easily precipitated onto the surface of the micro-porous particulates of the present invention by addition of relatively small amounts of concentrated aqueous chloride solutions of the desired polyvalent metal, thus ensuring that all of the specifically added polyvalent metal ions engage in the sorption process.

The disclosed invention is expected to greatly reduce the cost of mercury control by decreasing the overall cost of sorbent injected, and reducing costs for handling and disposing of spent sorbent. The formulation of the sorbents disclosed herein also results in stronger bonding of the mercury to the chemical amendment of the substrate material. The mercury present on used sorbent is thus more difficult to remove, resulting in a final waste form that is more stable and less likely to return the captured mercury to the environment via leaching or other natural processes after disposal.

One object of the invention is to reduce the cost and increase the effectiveness of mercury sorbents and to increase the cost effectiveness of methods and systems for removing mercury from flue gases. Another object of the invention is to prevent contamination of fly ash with activated carbon, thus facilitating continued beneficial use of this material as a component of concrete.

In a preferred embodiment, this invention is concerned with a process for preparing a solid sorbent and product prepared therefrom. The preferred multi-step process includes the steps of (1) subjecting an alkaline earth metal sulfite-rich or an alkaline earth metal sulfate-rich material to high temperature reduction utilizing coal or coke as the reductant to yield a light, ash-like, micro-porous alkaline earth metal sulfide-rich reactive substrate particulate, (2) admixing this reactive substrate particulate with elemental sulfur at a temperature above the melting temperature of elemental sulfur, and most preferably at a temperature above the boiling temperature of elemental sulfur, to incorporate elemental sulfur and polysulfide ions into the micro-porous alkaline earth metal sulfide-rich particulate, (3) grinding the admixture from step (2) to reduce aggregates to a size below about 20 microns in diameter. The high capacity sorbent resulting from this multi-step process is suitable for incorporation into concrete as a component of fly ash after it has been utilized for the removal of mercury from a coal combustion flue gas by injection and dispersion into the flue gas stream.

The sorbent of the present invention is preferably employed to capture elemental mercury or oxidized mercury species (mercuric chloride) from flue gas and other gases at temperatures from ambient to about 200 degrees C. A fixed bed may be employed, or the sorbent may be injected directly into the gas stream.

In a most preferred embodiment, dry coal combustion flue gas desulfurization calcium sulfite-rich by-product composed of particulates having cores of calcium oxide, calcium hydroxide, or calcium carbonate is admixed with coal or coke in the ratio of about 0.15 pounds of carbon for each pound of calcium sulfite contained in the flue gas desulfurization by-product. This admixture is subjected to temperatures in excess of about 900 degrees C. in a counter-current rotary kiln in a reducing environment to form micro-porous particulates composed at least partially of calcium sulfide, carbon dioxide, and carbon monoxide. The resulting particulates composed at least partially of calcium sulfide are admixed with elemental sulfur and the admixture is heated to a temperature above about 444 degrees C., the boiling temperature of elemental sulfur at atmospheric pressure. The admixture is then subjected to grinding to reduce the particulates constituting the admixture to a size of less than about 20 microns to yield a sorbent for mercury removal from flue gas.

ILLUSTRATIVE EXAMPLE

Strontium, one of the alkaline earth metals, occurs in nature primarily as strontium sulfate, the mineral celestite. Celestite rocks, typically containing about 90% strontium sulfate by weight and about 7% calcium carbonate as the principal impurity, are ground to yield coarse particles.

Ground celestite is admixed with powdered petroleum coke in the ratio of about 0.18 pounds of petroleum coke for each pound of ground celestite. This admixture is introduced into a countercurrent rotary kiln at the opposite end from the external source of heat, an oil or gas fired burner. The average residence time of the admixture in the rotary kiln is about 2 hours. Air intrusion into the kiln is restricted so that there is no free oxygen inside the rotary kiln. As the celestite and coke admixture moves through the rotary kiln, the admixture reaches a temperature of about 1050 degrees C. Exothermic chemical reactions occur in the rotary kiln, but the celestite and coke admixture remains as a bed of solid particulates as it moves through the rotary kiln.

The appearance of the admixture when it is discharged from the rotary kiln is that of a fine, light ash and chemical analysis reveals that about 90% of the strontium sulfate that entered the rotary kiln has been converted to strontium sulfide. Elemental sulfur is added to the admixture after it has been discharged from the rotary kiln while the admixture is still at a temperature above about 500 degrees C.; 0.20 pounds of sulfur is added for each pound of celestite ore added to the kiln. After the sulfur-containing admixture has cooled to a temperature below about 100 degrees C., aggregates within the ash-like material exiting the rotary kiln are ground to a particle size below about 20 microns. This fine particulate sulfur-containing admixture, when dispersed in a mercury-containing flue gas, will sorb at least some of the mercury in the flue gas stream.

The mercury sorbents of the present invention could be injected while mixed in with sorbents for other flue gas components, such as calcium or magnesium hydroxide or oxide for flue gas desulfurization, rather than injected alone. Other variations of the methods of applying this invention can be formulated by those familiar with the art and they should be considered within the scope of this disclosure and the included claims.

The invention claimed is:

1. A process for forming micro-porous particulates composed substantially of metal sulfides for use as sorbents for mercury comprising:
    Subjecting particulates composed substantially of metal sulfates, metal sulfites, or a combination thereof, to chemical reduction at a temperature in excess of about 900 degrees C. employing carbon, carbon monoxide, hydrogen, or a hydrocarbon such as natural gas as the reductant, to form particulates composed substantially of metal sulfides;
    admixing said particulates composed substantially of metal sulfides with up to 10% by weight of one or more polyvalent metal chlorides, or one or more polyvalent metal nitrates, or one or more polyvalent metal polysulfides, or sulfur, or any combination of these materials; then
    mechanically reducing the size of said particulates composed substantially of metal sulfides to an average particle size below about 20 microns.

2. The process of claim 1 wherein the particulates composed substantially of metal sulfates, metal sulfites, or a combination of both, to be subjected to chemical reduction are at least partially composed of alkaline earth metal or transition metal sulfates, alkaline earth metal or transition metal sulfites, or a combination of said sulfates and sulfites.

3. The process of claim 1 wherein the particulates composed substantially of metal sulfates, metal sulfites, or a combination of both, to be subjected to chemical reduction are composed substantially of calcium sulfate, calcium sulfite, or a combination of both.

4. The process of claim 3 wherein the particulates composed substantially of calcium sulfate, calcium sulfite, or a combination of both, to be subjected to chemical reduction are a by-product of coal combustion flue gas desulfurization.

5. The process of claim 4 wherein the particles composed substantially of calcium sulfate, calcium sulfite, or a combination of both, produced as a by-product of coal combustion flue gas desulfurization contain coal combustion ash as a component.

6. Particulates composed substantially of one or more polyvalent metal sulfides produced in the particulates by the chemical reduction of the corresponding metal sulfates, the corresponding metal sulfites, or any combination thereof at a temperature above about 900 degrees C. utilizing carbon, carbon monoxide, hydrogen, or natural gas as the reductant;
    said particulates also containing one or more polyvalent metal chlorides, or one or more polyvalent metal nitrates, or one or more polyvalent metal polysulfides, or sulfur, or any combination of these materials;
    and wherein said polyvalent metal chlorides, polyvalent metal nitrates, polyvalent metal polysulfides, sulfur, or any combination thereof, are incorporated into aforesaid particulates after aforesaid chemical reduction of the corresponding metal sulfates, metal sulfites, or any combination thereof; and
    wherein said particulates composed substantially of polyvalent metal sulfide have an average particle size of less than about twenty micrometers; and
    wherein said sorbent operates to capture at least some of the ionic and elemental mercury present in a flue gas to which it is exposed.

7. A method for removing mercury from a gas stream containing ionic and elemental mercury comprising:
    injecting and entraining the sorbent particulates of claim 6 into said gas stream under conditions wherein at least a portion of said elemental and ionic mercury sorbs onto the sorbent particulates during their exposure to the gas stream; and
    subsequently removing the sorbent particulates from the gas stream.

8. The process of claim 7 wherein the removing step is accomplished by means of a process selected from the group consisting of filtration, electrostatic precipitation, an inertial or centrifugal method, and wet scrubbing.

9. A power plant employing a mercury removal system operated in accordance with the method of claim 7.

10. A method for making a concrete admixture that comprises adding to a cement, aggregate, and fly ash admixture the sorbent particulates of claim 6 that have been employed to remove mercury from a gas stream.

11. A system for removing mercury from a gas, the system comprising: means for injecting the particulates of claim 6 into a flue gas stream;
    means for contacting the particulates of claim 6 with the flue gas stream to produce mercury-containing particulates; and
    means for separating the mercury-containing particulates from the flue gas stream.

12. A sorbent comprising:
    particulates substantially composed of calcium sulfide produced in the particulates by the chemical reduction of calcium sulfate, calcium sulfite, or a combination thereof at an elevated temperature; and
    sulfur or one or more polyvalent metal salts, including but not limited to chlorides, nitrates, sulfides, polysulfides, or any combination thereof; and
    wherein said sulfur or polyvalent metal salts, or any combination thereof, are applied to aforesaid particulates composed substantially of calcium sulfide after the chemical reduction at an elevated temperature of the corresponding calcium sulfate, calcium sulfite, or any combination thereof;

and wherein said particulates composed substantially of calcium sulfide have an average particle size of less than about twenty micrometers;

wherein said sorbent operates to capture at least some of the ionic and elemental mercury present in a flue gas to which it is exposed.

13. A method for removing mercury from a gas stream, the method comprising:

injecting and entraining the sorbent of claim 12 into the gas stream containing mercury under conditions wherein at least a portion of said mercury sorbs onto the sorbent particles during their exposure to the gas stream; and removing the sorbent particles from the gas stream by means of a process selected from the group consisting of filtration, electrostatic precipitation, an inertial method such as a cyclone, and wet scrubbing.

14. A method for removing mercury from a flue gas, the method comprising: injecting the sorbent of claim 12 into a flue gas stream; contacting the sorbent of claim 12 with the flue gas stream for sufficient time to produce a mercury-laden sorbent; and separating the mercury-laden sorbent from the flue gas stream.

15. An adsorbent composition for use in the adsorption of ionic and elemental mercury composed of particulates resulting from the chemical reduction at elevated temperatures of a material composed of alkaline earth metal sulfate, transition metal sulfate, alkaline earth metal sulfite, transition metal sulfite, or a combination thereof; said particulates additionally containing elemental sulfur, one or more alkaline earth metal or transition metal polysulfides added as discrete compounds, one or more alkaline earth metal or transition metal polysulfides formed through chemical oxidation of the corresponding alkaline earth metal or transition metal sulfides, or a combination thereof.

16. The adsorbent composition of claim 15 wherein the particulates resulting from the chemical reduction at elevated temperatures of a material composed of alkaline earth metal sulfate, transition metal sulfate, alkaline earth metal sulfite, transition metal sulfite, or a combination thereof, contain at least some alkaline earth metal sulfide produced by the chemical reduction of byproduct from coal combustion flue gas desulfurization composed of alkaline earth metal sulfate or alkaline earth metal sulfite, or a combination thereof.

17. A method for removing mercury from a gas, the method comprising:

flowing the gas containing mercury through a fixed or fluidized bed comprised of the adsorbant composition of claim 15.

18. A method for sorption of mercury from a gas, the method comprising:

injecting and entraining the adsorbent composition of claim 15 into a gas stream containing mercury at an operating pressure within about plus or minus 0.5 to 5.0 psig of ambient conditions; and removing the adsorbent composition from entrainment in the gas stream while still exposing it to the gas stream to produce a collected composition of matter that remains exposed to the gas stream for some time and that remains capable of sorption of mercury, said removing being accomplished by a process selected from a group of methods consisting of: filtration, electrostatic precipitation, inertial methods, and wet scrubbing;

wherein at least a portion of said sorption of mercury occurs onto the collected composition of matter while it remains exposed to the gas stream.

19. An incinerator plant or coal-fired power plant incorporating a mercury removal system operated in accordance with the technique of claim 18.

20. An adsorbent composition for use in the adsorption of elemental and ionic mercury consisting essentially of:

a support material selected from the class consisting of particulates substantially composed of alkaline earth metal sulfide, transition metal sulfide, or a combination thereof; said particulates resulting from the reductive thermal decomposition of alkaline earth metal sulfite, transition metal sulfite, alkaline earth metal sulfate, transition metal sulfate, or a combination thereof, and one or more cations selected from the group consisting of: bivalent tin ions, tetravalent tin ions, bivalent iron ions, trivalent iron ions, copper ions, titanium ions, manganese ions, zirconium ions, vanadium ions, zinc ions, nickel ions, bismuth ions, cobalt ions, and molybdenum ions applied to the surface of said particulates resulting from the reductive thermal decomposition of alkaline earth metal sulfite, transition metal sulfite, alkaline earth metal sulfate, transition metal sulfate, or a combination thereof.

21. The adsorbent composition of claim 20 wherein the one or more cations applied to the surface of said particulates are selected from the group consisting of copper, cobalt, manganese, nickel, and mixtures thereof.

22. A concrete additive comprising the adsorbent composition of claim 20 that has been used to remove mercury from a gas stream and coal combustion fly ash.

23. A process for the preparation of particles to be employed for the sorption of ionic and elemental mercury comprising:

subjecting a material composed of alkaline earth metal sulfite, alkaline earth metal sulfate, or a combination thereof to a temperature of at least about 900 degrees C. in the presence of a reducing agent selected from the group of carbon, hydrogen, natural gas, or a combination thereof, for sufficient time to reduce at least a majority of aforesaid alkaline earth metalm sulfite, alkaline earth metal sulfate, or a combination thereof, to alkaline earth metal sulfide to produce particulates containing alkaline earth metal sulfide and alkaline earth metal sulfite or alkaline earth metal sulfate, or a combination of these; adding to aforesaid particulates elemental sulfur, one or more alkaline earth metal or transition metal polysulfides added as discrete compounds, one or more alkaline earth metal or transition metal polysulfides formed through chemical oxidation of the corresponding alkaline earth metal or transition metal sulfides, or a combination thereof;

reducing the size of aforesaid particulates before, during, or after addition of elemental sulfur, one or more alkaline earth metal or transition metal polysulfides, or formation of alkaline earth metal or transition metal polysulfides through chemical oxidation; and, optionally, admixing the aforesaid particulates containing alkaline earth metal sulfide and alkaline earth metal sulfite or alkaline earth metalsulfate, or a combination thereof, with an aqueous solution containing at least one cation selected from the group consisting of antimony, arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof.

24. A process for the preparation of adsorbent compositions for mercury comprising:

providing a substrate selected from the class consisting of particulates substantially composed of alkaline earth metal sulfide, transition metal sulfide, or a combination thereof, and resulting from the reductive thermal decomposition of alkaline earth metal sulfite, transition metal sulfite, alkaline earth metal sulfate, transition metal sulfate, or any combination thereof, and admixing the substrate with at least about 1% elemental sulfur at an elevated temperature.

25. The process of claim 24 wherein the substrate selected from the class consisting of particulates substantially composed of alkaline earth metal sulfide, transition metal sulfide, or a combination thereof, consists of particulates at least partially composed of calcium sulfide, and said calcium sulfide containing particulates are contacted with gaseous elemental sulfur or liquid elemental sulfur.

* * * * *